(12) United States Patent
Faye et al.

(10) Patent No.: US 8,032,141 B2
(45) Date of Patent: Oct. 4, 2011

(54) METHOD OF TRANSMITTING DATA AND NETWORK

(75) Inventors: Jean-Claude Faye, Gif sur Yvette (FR); Denis Rouffet, Boulogne-Bilancourt (FR); Veronique Capdevielle, Magny les Hameaux (FR)

(73) Assignee: Alcatel Lecent, Paris (FR)

( * ) Notice: Subject to any disclaimer, the term of this patent is extended or adjusted under 35 U.S.C. 154(b) by 674 days.

(21) Appl. No.: 11/565,828

(22) Filed: Dec. 1, 2006

(65) Prior Publication Data

US 2007/0130348 A1 Jun. 7, 2007

(30) Foreign Application Priority Data

Dec. 5, 2005 (EP) ..................................... 05292605

(51) Int. Cl.
*H04M 11/00* (2006.01)
(52) U.S. Cl. ........................ 455/439; 370/338
(58) Field of Classification Search ............... 455/426.1, 455/432.1, 433, 439
See application file for complete search history.

(56) References Cited

U.S. PATENT DOCUMENTS

| | | | | |
|---|---|---|---|---|
| 5,434,992 A * | 7/1995 | Mattson | ....................... | 711/119 |
| 5,825,759 A * | 10/1998 | Liu | ................. | 370/331 |
| 6,907,501 B2 * | 6/2005 | Tariq et al. | ..................... | 711/118 |
| 6,941,338 B1 * | 9/2005 | Madsen | ........................ | 709/203 |
| 6,978,306 B2 * | 12/2005 | Miller et al. | .................. | 709/226 |
| 7,079,945 B1 * | 7/2006 | Kaplan | ......................... | 701/208 |
| 7,801,530 B2 * | 9/2010 | Oswal et al. | ................... | 455/437 |
| 2001/0037389 A1 * | 11/2001 | Fujimori et al. | .............. | 709/225 |
| 2003/0073452 A1 * | 4/2003 | Omae et al. | ..................... | 455/466 |
| 2005/0128995 A1 * | 6/2005 | Ott et al. | ........................ | 370/349 |
| 2005/0266853 A1 * | 12/2005 | Gallagher et al. | ............. | 455/439 |
| 2006/0020716 A1 * | 1/2006 | Suryanarayana | ............. | 709/248 |
| 2006/0046647 A1 * | 3/2006 | Parikh et al. | .................. | 455/11.1 |
| 2006/0058046 A1 * | 3/2006 | Matsuura et al. | ............. | 455/457 |

FOREIGN PATENT DOCUMENTS

DE 100 25 725 A1 12/2001
WO WO 2005/011299 A2 2/2005

OTHER PUBLICATIONS

Eun Kyoung Paik et al, "Prediction-based fast handoff for mobile WLANS", Telecommunications, 2003. ICT 2003. 10$^{TH}$ International Conference—Feb.23-Mar. 1, 2003, Piscataway, NJ, USA, IEEE, vol. 1, Feb. 23, 2003, pp. 748-753, XP010637896.

* cited by examiner

*Primary Examiner* — Nghi H. Ly
*Assistant Examiner* — Joseph Dean, Jr.
(74) *Attorney, Agent, or Firm* — Fay Sharpe LLP

(57) ABSTRACT

A method of transmitting data between a content server (11) and a terminal (17) belonging to a discontinuous coverage network, the terminal (17) moving from a first radio coverage area (14, 161) to a second radio coverage area (14, 162) over an area (14*a*) comprising no radio coverage. The method includes: terminating (100) one or more protocols used by the content server (11) for the data transmission with the terminal (17) within a proxy, wherein the proxy is seen as the entry point of the discontinuous coverage network by the content server (11), and using a caching mechanism provided within the discontinuous coverage network for forwarding (200) data from the proxy to the terminal (17).

20 Claims, 3 Drawing Sheets

METHOD OF TRANSMITTING DATA AND NETWORK

The invention is based on a priority application EP05292605.2 which is hereby incorporated by reference.

TECHNICAL FIELD

The present invention relates to a method of transmitting data between a content server and a terminal belonging to a discontinuous coverage network, said terminal moving from a first radio coverage area to a second radio coverage area over an area comprising no radio coverage.

The present invention further relates to a discontinuous coverage network comprising one or more radio coverage areas and being capable of transmitting data received from a content server to a terminal that moves between and/or resides in said radio coverage areas.

BACKGROUND OF THE INVENTION

Discontinuous coverage networks are radio access networks which do not provide a continuous radio coverage contrary to conventional second or third generation radio access networks as GSM or UMTS. Such discontinuous coverage networks are constituted by islands of radio coverage supporting very high bit rates and low power cells. Such networks are commonly referred as fourth generation (4G) access networks. They inter alia provide video/audio streaming services and fast downloads or uploads of large data volumes.

The islands having radio coverage are nevertheless separated by areas without any radio coverage so that applying usual handover procedures between cells according to common techniques is not possible.

In such networks, mobile terminals have a reduced mobility. They cannot leave the radio coverage area without loosing the connection.

A fast mobile IP solution is currently investigated at the IETF for solving this problem. Mobile IP solutions consist in introducing a home agent between the content server and the access controller. The IP address of the moving terminal is modified during terminal mobility. The current IP address of the moving terminal is stored at the home agent together with a permanent IP address. The mobility is totally transparent for the content server which sends the content to the permanent IP address. The translation is performed at the home agent which in turn identifies the access controller under the coverage of which the moving terminal is currently located. This solution enables it to support mobility in IP networks. Nevertheless, even if the speed of the process is accelerated, such a solution do not provide an efficient answer to the need for providing very high rate streaming services to a moving terminal leaving temporarily the zone of radio coverage.

Furthermore, if the time during which the terminal resides in an area without radio coverage is too long, the data transmission between the terminal and an external network element such as a content provider may be negatively affected in that the behaviour of an application related to the data transmission is modified. For instance, an ongoing communication could completely be stopped or a network interface might appear to be unavailable.

SUMMARY OF THE INVENTION

Therefore, it is an object of the present invention to provide an improved method and network of the above mentioned type, which avoid at least some of the discussed disadvantages of prior art.

According to the present invention, regarding said method this object is achieved by the following steps:
terminating one or more protocols used by said content server for the data transmission with the terminal within a proxy, wherein said proxy is seen as the entry point of the discontinuous coverage network by said content server,
using a caching mechanism provided within said discontinuous coverage network for forwarding data from said proxy to said terminal.

The inventive termination of one or more network protocols used for the data transmission between said content server and said terminal within the proxy enables to maintain a data transmission session with said terminal even if the terminal is currently not within a radio coverage area of the network.

Even a standard delivery of data to the terminal may be simulated to the content server according to a preferred embodiment of the inventive method. In this case, the content server is not notified of the fact that the terminal is temporarily out of a radio coverage area or unavailable due to any other reason. Consequently, the content server may advantageously proceed with its data transmission to the terminal via the inventive proxy without experiencing any discontinuity that would require an additional overhead such as retransmissions of data packets and the like.

Data which has been received from said content server within said discontinuous coverage network may be forwarded by the inventive proxy either directly to said terminal or via a radio access point or an access controller or any other network element capable of temporarily storing or forwarding said data to the terminal.

The functionality of the inventive proxy is advantageously implemented in a network element of said discontinuous coverage network, in particular within an access controller and/or a radio access point of said discontinuous coverage network.

According to a further advantageous embodiment of the present invention, data which is to be forwarded from said proxy to said terminal is partitioned into cache units, preferably numbered cache units, which may e.g. be consumed by the terminal according to their respective numbers, whereby a particularly secure handling and delivery of cached data to the terminal is accomplished.

The cache units may e.g. be stored within an access controller and/or a radio access point of said discontinuous coverage network.

According to a further advantageous embodiment of the present invention, said terminal performs a request to said access controller and/or said radio access point in order to determine whether cache units are available for said terminal. Said request is preferably at least performed whenever the terminal enters a new area of radio coverage.

A further solution to the object of the present invention is given by a discontinuous coverage network according to claim 11.

Other advantageous embodiments of the present invention are defined by the dependent claims.

BRIEF DESCRIPTION OF THE DRAWINGS

Further advantages and features of the present invention are described in the following detailed description with reference to the drawings in which.

DETAILED DESCRIPTION OF PREFERRED EMBODIMENTS

Figure 1C:
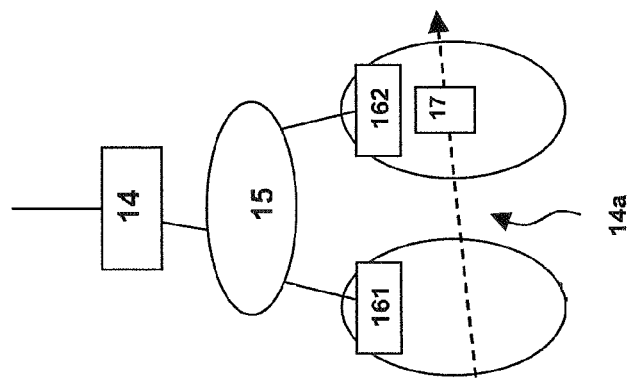
FIG. 1a-FIG. 1c show an implementation of the present invention in the context of a discontinuous coverage radio access network supporting micro mobility.
Figure 1B:
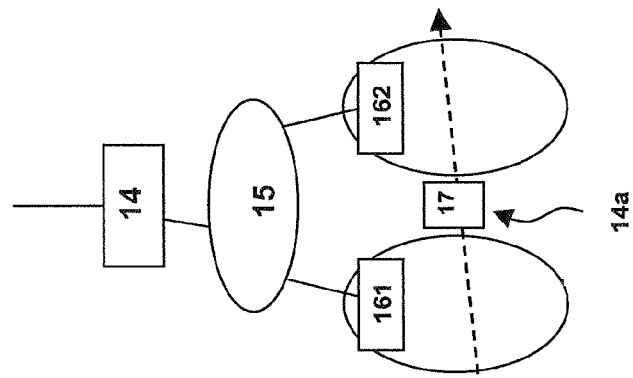
Figure 1A:
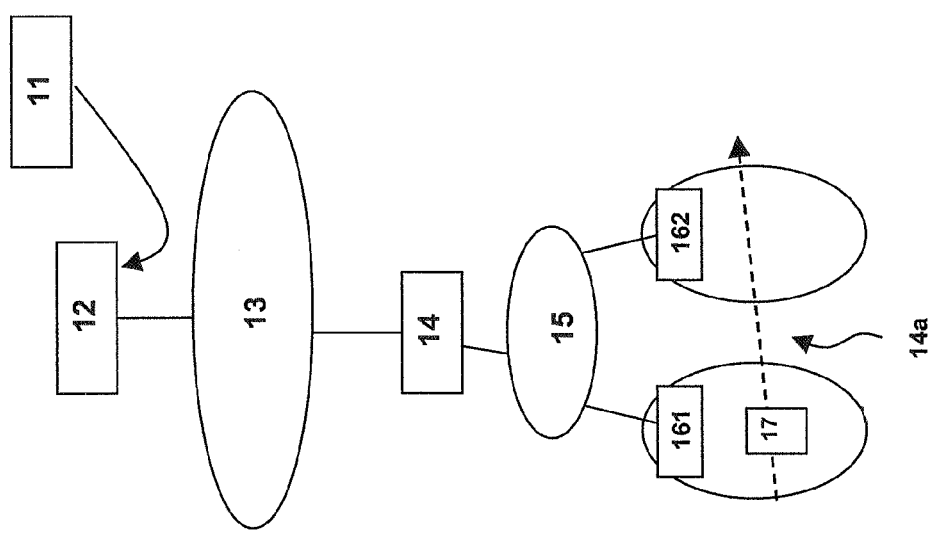

FIGS. 1a to 1c show an implementation of the present invention in the context of a discontinuous coverage radio access network. FIGS. 1a to 1c illustrate an example of network architecture for such fourth generation radio access networks where the present invention may be implemented.

The radio access network comprises a content server 11, one or more access controllers 14, radio access points 161, 162 and terminals 17. Content server 11 and access controller 14 are connected to an IP network 13, access controller 14 and radio access points 161, 162 are connected to a transmission network 15. Terminals 17 are accessible from radio access points 161, 162 through an radio-based air interface.

Each pair of access controller and radio access point 14, 161; 14, 162 defines a respective zone of radio coverage. In the present example the radio coverage is discontinuous, i.e. there are also areas 14a without any radio coverage. These areas 14a without radio coverage are situated between two areas of radio coverage 14, 161; 14, 162. It will be understood by the person skilled in the art that the present invention may also apply to mixed continuous and discontinuous networks.

FIG. 1a represents the case where said terminal 17 is within a first radio coverage area 14, 161. The terminal 17 includes a cache memory (not shown). FIG. 1b represents the case where said terminal 17 is in an area 14a without radio coverage. FIG. 1c represents the case where said terminal 17 is entering a second radio coverage area 14, 162. The depicted scenario illustrates a so-called micro-mobility case, in which two consecutive coverage areas 14, 161; 14, 162 visited by said terminal 17 are serviced by the same access controller 14.

According to the present invention, the access controller 14—additionally to its basic functions—implements a proxy functionality which enables the access controller 14 to terminate one or more protocols used by said content server 11 for the data transmission with the terminal 17. The respective step 100 of terminating is illustrated in the simplified flow chart of FIG. 3.

Since said proxy is usually seen as the entry point of the discontinuous coverage network by said content server 11, the inventive process of terminating 100 certain protocols enables to maintain a data transmission between the content server 11 and the network even if the terminal 17 itself is currently not within a radio coverage area 14, 161; 14, 162 and thus the terminal 17 is not able to respond to any data transmissions of the content server 11.

Advantageously, said responding and the like is taken over by the proxy, and in general, a standard delivery of data to the terminal 17 is simulated to the content server 11 by the proxy.

For instance, if a real time streaming protocol (RTP) is used for a data transmission between said content server 11 and said terminal 17, according to the present invention, the access controller 14 in its inventive proxy function may terminate the RTP protocol and may accordingly immediately return corresponding RTCP (realtime transport protocol control protocol) RR (receiver report)-messages to the content server 11. In turn, the proxy inhibits any RR-messages which may have been sent from the terminal 17 to the content server 11.

Thus, performing the inventive method e.g. enables the proxy to timely supply the content server 11 with RR-messages which are necessary to maintain the data transmission with the content server 11, independent of the state and/or availability of the terminal 17.

Figure 3:
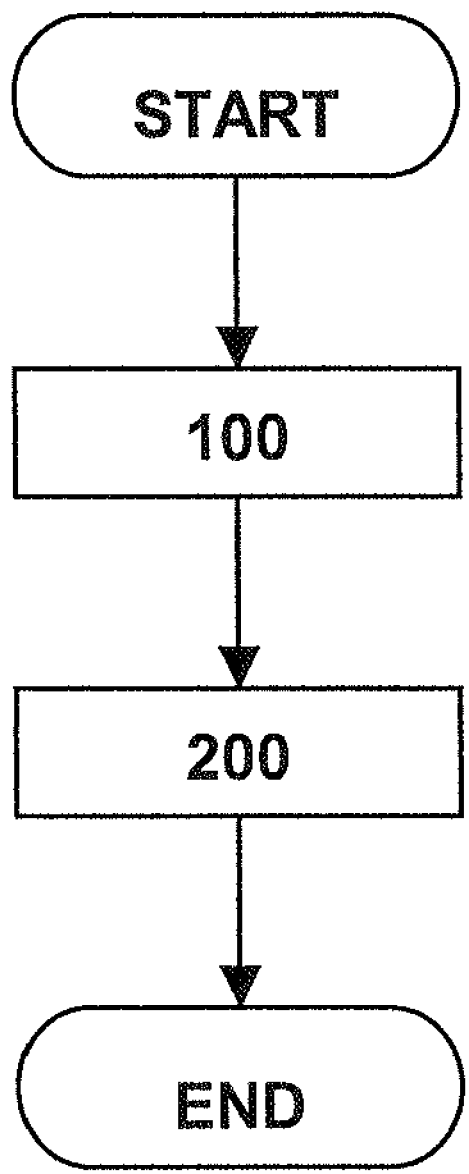
FIG. 3 shows a simplified flowchart of an embodiment of a method according to the present invention.

A further inventive measure symbolized by step 200 of the flow chart of FIG. 3 consists in using a caching mechanism provided within said discontinuous coverage network for forwarding data from said proxy to said terminal 17.

I.e., simultaneously to the handling of e.g. RR-messages and other protocol-related operations which are necessary to maintain a data transmission or communication, respectively, with the content server 11, data received from the content server 11 which is to be forwarded to the terminal 17 is forwarded using a caching mechanism of the network. Thus it is guaranteed that said data will successfully be forwarded to the terminal 17 even if it is currently not within any of the radio coverage areas 14, 161; 14, 162.

Data from the content server 11 may e.g. be forwarded from the proxy to a radio access point 161, 162 or to an access controller 14 which may temporarily store said data and later on forward it to the terminal 17.

However, according to the present invention, it is also possible for the proxy to directly forward said data to a radio access point 161, 162 of the radio coverage area 14, 161; 14, 162 the terminal 17 presently resides in.

It is also possible for the proxy to directly forward said data to a radio access point 162 of the radio coverage area 14, 162 the terminal 17 is expected to visit in future.

Should the current position of the terminal 17 be known in the proxy, the data received from the content server 11 may also be directly forwarded to the terminal 17.

Generally, caching data to be transmitted to the terminal according to the present invention may be performed by any network element that is capable of temporarily storing said data.

A further particularly advantageous embodiment of the present invention provides for partitioning data which is to be forwarded from said proxy to said terminal 17 into cache units, preferably numbered cache units. As described above, said cache units may e.g. be stored within an access controller 14 and/or a radio access point 161, 162 of said discontinuous coverage network. The numbering of said cache units ensures a secure handling and delivery to the terminal 17.

Advantageously, said terminal 17 performs a request to said access controller 14 and/or said radio access point 161, 162 in order to determine whether cache units are available for said terminal 17. Said request is preferably performed whenever said terminal 17 leaves an area 14a without radio coverage and enters a new radio coverage area 14, 161; 14, 162. If there are cache units available, the terminal 17 may receive them and directly consume them or cache them for future use.

Preferably, the terminal 17 also comprises a local cache memory and fills said local cache memory with data, in particular prior to leaving a radio coverage area 14, 161; 14, 162 said terminal 17 presently resides in.

Figure 2A:
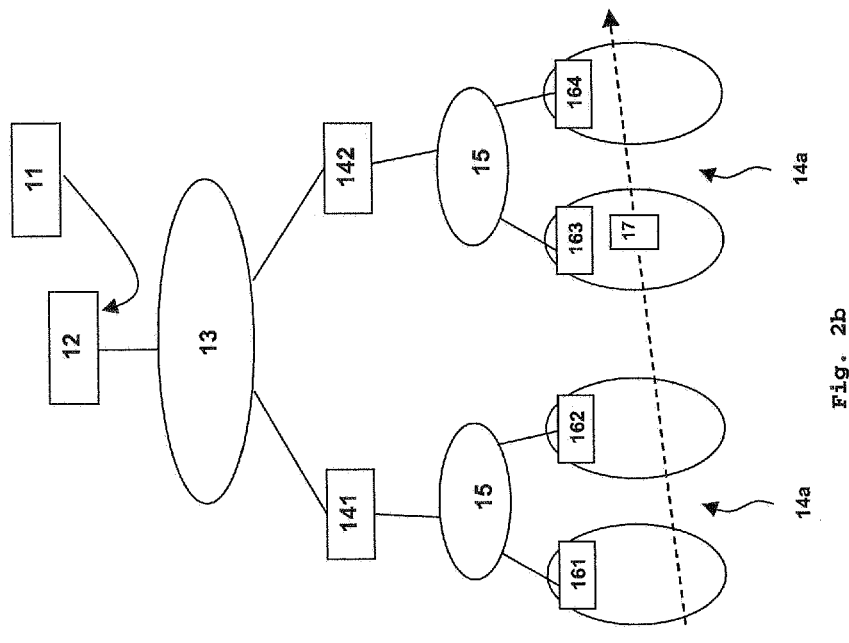
FIG. 2a-FIG. 2b show an implementation of the present invention in the context of a mobile IP based discontinuous coverage radio access network supporting macro mobility.
Figure 2B:
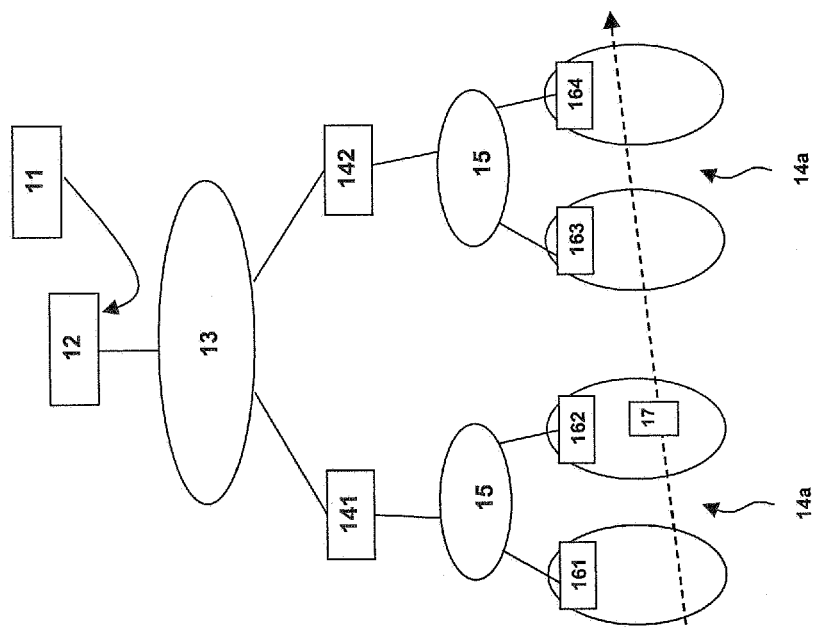

FIGS. 2a, 2b show an implementation of the present invention in the context of a mobile IP based discontinuous coverage radio access network supporting macro mobility. FIG. 2a illustrates an example of a network configuration for such fourth generation radio access networks where the present invention may be implemented.

The radio access network comprises a content server 11, access controllers 141, 142, and radio access points 161, 162, 163, 164. Content server 11 and access controllers 141, 142 are connected to an IP network 13 which supports the mobile IP functionality thanks to Home Agent (HA) 12 and thanks to Foreign Agents (FA) each associated to one access controller. The HA is associated to the service provided by content server 11 and provides for a unique IP address for the terminal 17 seen from content server 11. The FA are adapted to take in charge the mobility of the terminal by sending updated information to a table located in HA which registers under the control of which access controller 141, 142, terminal 17 is currently located. Consequently, a translation between the unique IP address used by content server 11 and the local IP address can take place and the data destined to terminal 17 are routed to the appropriate access controller 141, 142.

Access controllers 141, 142 and radio access points 161, 164 are connected to a transmission network 15. The terminals 17 are accessible from radio access points 161, . . . , 164 via an air interface.

Each pair access controller, radio access point (141, 161), (141, 162), (142, 163), (142, 164) defines a zone of radio coverage. In the example described below the radio coverage is discontinuous so that there remain areas 14a of non radio coverage between two areas of radio coverage. It will be understood by the person skilled in the art that the present invention may also apply to mixed continuous and discontinuous networks.

FIG. 2a represents the case where the terminal 17 is under the radio coverage of the coverage area (141, 162). FIG. 2B represents the case where the terminal 17 has moved to a new coverage area (142, 163). This case illustrates the macro-diversity case (i.e. the consecutive coverage areas visited by terminal 17 are serviced by different access controller 141, 142).

The inventive method of providing proxy functionality and of simulating a standard data delivery to the content server 11 as already described above with respect to the network scenario of FIGS. 1a to 1c, may also be applied to the network scenario of FIG. 2a, 2b, i.e. in a macro-diversity case.

The proxy functionality may for instance also be implemented within the HA 12.

The present invention enables to benefit from a continuous session control regarding the data transmission between the content server 11 and the terminal 17 even if the terminal 17 is temporarily out of a radio coverage area and if the TOP is used.

The invention claimed is:

1. A method of transmitting data between a content server and a terminal belonging to a discontinuous coverage network, said terminal moving from a first radio coverage area to a second radio coverage area over an area comprising no radio coverage, said method including:
   terminating one or more protocols used by said content server for the data transmission with the terminal within a proxy, wherein said proxy is seen as the entry point of the discontinuous coverage network by said content server;
   using a caching mechanism provided within said discontinuous coverage network for forwarding data from said proxy to said terminal via a radio access point of the radio coverage area the terminal is expected to visit in the future;
   partitioning data which is to be forwarded from said proxy to said terminal into cache units;
   storing said cache units within an access controller and/or a radio access point of said discontinuous coverage network, wherein said cache units are stored when the terminal moves over the area comprising no radio coverage.

2. The method according to claim 1, wherein directly forwarding said data from said proxy to said terminal if said terminal is currently within a radio coverage area.

3. The method according to claim 1, wherein forwarding said data from said proxy to a radio access point of the radio coverage area the terminal presently resides in.

4. The method according to claim 1, further comprising simulating a standard delivery of data to the terminal to said content server.

5. The method according to claim 1, wherein said terminal performs a request to said access controller and/or said radio access point in order to determine whether cache units are available for said terminal.

6. The method according to claim 1, wherein said terminal comprises a local cache memory and wherein said terminal fills said cache memory with data prior to leaving a radio coverage area said terminal presently resides in.

7. The method according to claim 1 further comprising:
   using a home agent operatively connected to the content server to provide a unique IP address for the terminal, wherein the home agent contains a table with the location and local IP address of the terminal,
   using a foreign agent to send updated information about the location and the local IP address of the terminal to the home agent, and
   translating between the unique IP address of the home agent and the local IP address of the terminal.

8. The method according to claim 7 wherein the home agent and/or the foreign agent are operatively associated with an access controller.

9. The method according to claim 1 wherein the cache units are numbered cache units.

10. The method according to claim 1 wherein said cache units are stored when the terminal moves over the area comprising no radio coverage.

11. The method according to claim 10, wherein said terminal performs a request to said access controller and/or said radio access point in order to determine whether cache units are available for said terminal after entering the second radio coverage area.

12. The method of claim 1, wherein the terminating comprises timely supplying the content server with messages that are necessary to maintain the data transmission with the content server independent of the state and/or availability of the terminal.

13. The method of claim 1, wherein the content server remains at a fixed location as the terminal moves from the first radio coverage area to the second radio coverage area.

14. The method of claim 1, wherein the one or more protocols includes a real time streaming protocol.

15. The method of claim 14, wherein the terminating includes periodically returning real time transport protocol control protocol receiver report messages to the content server independent of the state and/or availability of the terminal.

16. A discontinuous coverage network comprising: one or more radio coverage areas and being capable of transmitting data received from a content server to a terminal that moves between and/or resides in said radio coverage areas, a network element having proxy functionality for terminating one or more protocols used by said content server for the data transmission with the terminal, the network configured to forward data from said proxy network element to said terminal via a radio access point of the radio coverage area the terminal is expected to visit in the future; and a caching mechanism for forwarding data from said proxy network element to said terminal via a radio access point of the radio coverage area the terminal is expected to visit in the future; said network element partitioning data which is to be forwarded from said proxy to said terminal into cache units, and storing said cash units within an access controller or within said radio access point when the terminal moves over the area comprising no radio coverage.

17. The network according to claim 16 wherein the terminal includes a local cache memory, the caching mechanism contains the data partitioned into cache units, and the terminal is operative to fill the local cache memory with data prior to leaving the one or more radio coverage areas.

18. The network according to claim 16, wherein the network element predicts the radio access point of the radio coverage area the terminal is expected to visit in the future.

19. A method of transmitting data between a content server and a terminal belonging to a discontinuous coverage network, said terminal moving from a first radio coverage area to a second radio coverage area over an area comprising no radio coverage, said method including:
   terminating one or more protocols used by said content server for the data transmission with the terminal within a proxy, wherein said proxy is seen as the entry point of the discontinuous coverage network by said content server,
   using a caching mechanism provided within said discontinuous coverage network for forwarding data from said proxy to said terminal,
   partitioning data which is to be forwarded from said proxy to said terminal into cache units, and
   storing said cache units within an access controller and/or a radio access point of said discontinuous coverage network when the terminal moves over the area comprising no radio coverage, wherein said terminal performs a request to said access controller and/or said radio access point in order to determine whether cache units are available for said terminal after entering the second radio coverage area.

20. The method according to claim 19, further comprising forwarding said data from said proxy to a radio access point of the radio coverage area the terminal is expected to visit in future.

* * * * *